3,451,971
PROCESS FOR THE PRODUCTION OF POLY-
ETHYLENE TEREPHTHALATE FREE OF OB-
JECTIONABLE COLORATION
Stanley D. Lazarus, Petersburg, Va., assignor to Allied
 Chemical Corporation, New York, N.Y., a corporation
 of New York
No Drawing. Continuation-in-part of application Ser. No.
 441,353, Mar. 19, 1965. This application May 21, 1968,
 Ser. No. 730,907
Int. Cl. C08g 17/015
U.S. Cl. 260—75                                  9 Claims

ABSTRACT OF THE DISCLOSURE

Colorless polyesters useful for making films and filaments are produced by polymerization in admixture with antimony trioxide catalyst and an oxygen-containing oxidizing agent capable of oxidizing metallic antimony to trivalent antimony. The amount of oxidizing agent used corresponds to between about 0.5 equivalent and about 6 equivalents of oxygen per mole of antimony trioxide present in the polymerization system.

---

This is a continuation-in-part of my U.S. patent application Ser. No. 441,353, filed Mar. 19, 1965, now abandoned.

This invention relates to the production of linear polyesters. More particularly, it relates to the improved production of linear polyesters by antimony trioxide-catalysed polymerization whereby the resultant polyester is free of objectionable coloration.

It is known to produce linear polyesters by means of polyesterification between a dicarboxylic acid and a dihydric alcohol. Alternatively, such polyesters can be produced by "polyalcoholysis" between a diester and a dihydric alcohol. Noteworthy among polyesters produced by these means are those derived from aromatic diacids (e.g., terephthalic acid) and diesters (e.g., lower dialkyl terephthalates, bis-2-hydroxyethyl terephthalate) dialkyl terephthalates, bis-2-hydroxyethyl terephthalate) and acrylic and alicyclic diols (e.g., ethylene glycol). Polyesters synthesized by the above methods are useful for making films and filaments, and polyesters of intrinsic viscosity between about 0.4 and about 1.0 are especially useful for this purpose.

It is also known to use antimony trioxide as a preferred catalyst in the above reactions to produce useful film- and filament-forming polyesters. Unfortunately, however, the use of antimony trioxide as catalyst suffers from the fact that the resultant polyesters are generally discolored.

Therefore, it is an object of the present invention to provide an improvement in the method for producing film- and filament-forming polyesters by antimony trioxide-catalysed polymerization, whereby the resultant polyesters are free of objectionable coloration.

This and other objects as well as a fuller understanding of the present invention and its advantages can be had by reference to the following detailed description and claims.

The objects of this invention are achieved by carrying out the above-described, conventional production of polyesters in the presence of a catalytic amount of antimony trioxide and an oxygen-containing oxidizing agent capable of oxidizing metallic antimony to trivalent antimony. The standard potental for the half-reaction: ⅓ Sb→⅓ $Sb^{+++}+e$ is about (−0.15) volt. Accordingly, an oxidizing agent suitable for use in the present invention should have a positive standard oxidation potential of greater than about 0.15 volt and preferably at least about 0.2 volt when acting as oxidizing agent for conversion of metallic antimony to trivalent antimony (i.e., antimony trioxide).

In general, between about 0.01% and about 0.1% of antimony trioxide, based upon the weight of a polyester-forming carbonyl precursor, which is lower alkyl diester, that is, dimethyl terephthalate or dicarboxylic acid. A catalyst concentration of between about 0.03% and about 0.6% is preferred in most instances. The use of antimony trioxide per se in the production of polyesters by polycondensation and polyalcoholysis methods is described in United States Letters Patent No. 2,647,885 to Billica. This reference also describes conventional polymerization procedures and limitations on conditions of temperature, pressure, reaction times and the like which are not critical to success of the present invention. In the case where the polyester is polyethylene terephthalate, it is customary to proceed in two stages, whereby bis-2-hydroxyethyl terephthalate is obtained as a stable intermediate. This species can be prepared either by ester interchange between ethylene glycol and dimethyl terephthalate or by direct esterification of terephthalic acid with ethylene glycol. In the second case, the polyester-forming carbonyl precursor is taken to be terephthalic acid. The antimony trioxide polymerization catalyst can be added to pre-formed bis-2-hydroxyethyl terephthalate or to the mixture of diol and dimethyl terephthalate or terephthalic acid.

Oxygen-containing oxidizing agents suitable for use in the present invention include molecular oxygen (e.g., oxygen, air, mixtures of oxygen and nitrogen, and the like); peroxides (e.g., performic acid, peracetic acid, benzoyl peroxide, and the like); alkali metal chlorates (e.g., sodium chlorate and the like); alkali metal perchlorates (e.g., potassium perchlorate and the like); alkali metal perborates (e.g., sodium perborate, potassium perborate, and the like); and alkali metal permanganates (e.g., sodium permanganate and the like).

The amount of oxidizing agent used should be controlled, since the use of too little oxidizing agent does not secure the full advantages of the present invention, and the use of a great excess of oxidizing agent can result in undesirable coloration. The advantages of the present invention can be realized by using a suitable oxidizing agent or mixture thereof in amount corresponding to between about 0.5 equivalent and about 6 equivalents of oxygen per mole of antimony trioxide in the reaction mixture. Preferably, between about 0.6 equivalent and about 4.0 equivalents are used.

The oxygen-containing oxidizing agent can be added to the reaction system at any point during the polymerization process. Desirably, the oxidizing agent is added after the addition of antimony trioxide, and preferably after the polymerization reaction has proceeded to at least about 50% completion as measured by the reduced viscosity of the polyester attaining at least about half of its ultimate value. The oxidizing agent can be added at or near the end of the polymerization reaction subject to the proviso that sufficient time be allowed to permit reoxidation of metallic antimony to trivalent antimony as evidenced by the disapperance of all coloration. Preferably, the polyester product has a final intrinsic viscosity of between about 0.4 and about 1.0, since this intrinsic viscosity range corresponds to polyesters which are most desirable for producing useful films and filaments.

When conventional polymerization methods for producing polyesters under antimony trioxide catalysis are modified by incorporating therein the novel features of the present invention, an improved process results wherein essentially water-white, colorless polyester is produced.

The following examples are illustrative of the improved process of the present invention as applied to the production of polyethylene terephthalate having intrinsic viscosities between 0.4 and 1.0.

In the examples, polymer color or whiteness is determined by comparison with the visual color scale described in United States Letters Patent No. 2,650,213 to Hofrichter, Jr. at column 4, lines 8-17 thereof.

Intrinsic viscosity of polymers, as used herein, is determined in the manner described in the above-mentioned Billica patent.

Reduced viscosity of polymers, as used herein, is determined by viscosity measurements carried out on a sample of polymer dissolved in purified orthochlorophenol containing 0.1% by weight water, at 25° C. and at a concentration of 0.5% by weight. Employing a standard Cannon-Fenske 150 bore viscometer, the flow times of the polymer solution ($t_p$) and the solvent ($t_s$) are measured, and the reduced viscosity is calculated using the following equation:

$$N_{red} = (N_r - 1)/C$$

where:

$N_{red}$ = reduced viscosity
$C$ = concentration of dissolved polymer in grams/100 ml.
$N_r$ = relative viscosity = $t_p/t_s$.

EXAMPLE 1

A conventional polymerization kettle is charged with 10 lbs. of dimethyl terephthalate, 19 lbs. 3 oz. of ethylene glycol, and 4.54 grams of calcium acetate. The kettle is equipped with a double spiral agitator, heating jacket, provision for reflux and removal of condensate, Dowtherm (diphenyl/diphenyl oxide eutectic mixture) heating system, thermocouples, temperature controllers, and conventional sealing means together with a vapor valve for addition or removal of gas in the region above surface of the liquid reaction mixture.

The Dowtherm is circulated through the heating jacket at 185° C. for 2 hours with the agitator operating at 18 revolutions per minute, during which time the pressure in the sealed kettle reaches 40 p.s.i.g. The temperature is then raised to 205° C. and the vapor valve is adjusted to allow gases to be condensed in the condenser and removed in such a way that the pressure is maintained at 35 p.s.i.g. After 2 hours at 205° C., the temperature is increased to 230° C. A pressure of 35 p.s.i.g. is maintained at 230° C. for 2 hours. Then the pressure is reduced to atmospheric over a 30-minute interval. At the end of this time, the reaction mixture comprises mainly bis-2-hydroxyethyl terephthalate.

Antimony trioxide (2.72 grams) is then added through the charging port and the temperature is raised to 280° C. while sweeping the surface with nitrogen for 1 hour to ensure the removal of oxygen. Polymerization is continued for 4 hours at 280° C. under vacuum with a residual pressure of 0.2 mm. Hg.

At this point the polymerization is well over half complete in terms of reduced viscosity attained. One liter of air as measured at conditions of standard temperature and pressure (hereinafter "STP") is now admitted to the kettle. This corresponds to about 0.6 equivalent of oxygen per mole of antimony trioxide. Agitation is continued for 30 minutes, after which time the polymer is forced out if an extrusion port at the bottom of the kettle, under pressure of 50 p.s.i.g. nitrogen, into a quench trough filled with ice water. The solidified extrudate strand is taken up on a reel.

The resultant strand is water white (color scale I as per U.S. Patent 2,650,213) and transparent. When crystallized in an oven at 120° C., it becomes opaque, remaining prefectly white. This polymer has a reduced viscosity of 0.88. It has 30 equivalents of COOH groups and 62 equivalents of OH groups per $10^6$ grams of polymer, and a melting point of 254° C. as determined by noting disappearance of birefringence under a microscope equipped with a hot stage.

A comparable run without the admission of air to the kettle yields a transparent, amber-green, color scale II polymer strand having black specks which are shown by X-ray fluorescence to be high in antimony content. Upon crystallization this strand has a light gray coloration.

EXAMPLE 2

A charge of 15 lbs. of purified terephthalic acid, 16 lb. 12 oz. of ethylene glycol, and 6.81 grams of calcium acetate are charged to the kettle used in Example 1. The Dowtherm controller is set at 260° C. and the agitator started at 18 r.p.m.

With the vapor and reflux valves closed, the pressure is allowed to reach 40 p.s.i.g. The vapor and reflux valves are then opened and refluxing is continued for 4 hours while pressure in excess of 35 p.s.i.g. is relieved via the vapor valve. The pressure is then reduced to atmospheric, after which the temperature is raised to 280° C. and a sweep of nitrogen gas is started across the surface of the polymer melt at a rate of 0.03 ft.$^3$/hr./in.$^2$ of reaction mixture surface. After 1 hour of sweeping, 4.08 grams of antimony trioxide are added through the charging port and a vacuum (0.2 mm. Hg pressure) is established in the kettle. The vacuum is maintained for 4 hours at a polymerization temperature of 280° C. During this time the agitator velocity is gradually reduced to 10 r.p.m. Two liters (STP), of air are metered into the kettle. This corresponds to about 0.8 equivalent of oxygen per mole of antimony trioxide. Agitation is continued for 20 minutes, after which the polymer is extruded, quenched, and taken up on a reel as in Example 1.

The resultant polymer ribbon is transparent and water white of color scale I. Upon annealing, the product becomes opaque but remains pure white. It has a reduced viscosity of 0.75 and a melting point of 253° C. End-group analysis of the polyester shows 45 equivalents of COOH and 88 equivalents of OH per $10^6$ grams of polymer.

By way of comparison, the same polymerization is carried out but omitting the addition of air to the reaction system. The resultant polymer strands are of color scale II and contain black specks of metallic antimony. The annealed samples are of a light gray color.

EXAMPLE 3

Example 2 is repeated with the exception that instead of using oxygen as the oxidizing agent, a series of different oxidizing agents are employed in various amounts. The runs performed and results obtained are presented in table below.

TABLE I

| Oxidizing agent | Amount[1] | Color of polyester |
| --- | --- | --- |
| Potassium chlorate | 0.5 | II |
| Do | 2.5 | I |
| Do | 4.0 | I |
| Sodium perchlorate | 1.5 | I |
| Potassium permanganate | 3.5 | I |
| Do | 6.0 | I |
| Do | 7.0 | II |

[1] Equivalents if oxidizing agent per mole of antimony trioxide; determined as the amount of oxidizing agent which would be required to oxidize antimony to produce the amount of antimony trioxide present in the polymer.

The results in Table I show that the use of oxidizing agent in amounts substantially outside the range of between about 0.5 equivalent and about 6 equivalents of oxygen per mole of antimony trioxide in the polymer results in polyester product which is colored to an undesirable extent.

The foregoing examples are presented for the purpose of illustrating the novel improved process of the present invention. It is of course understood that variations in the procedures described in those examples as well as changes in the materials used therein can be made without departing from the scope of the invention. Other advantages over the prior art, not disclosed herein may also exist for this invention which is defined in the following claims.

I claim:

1. In a process for producing a fiber- and filament-forming polyester by ester interchange of lower alkyl diester of terephthalic acid and ethylene glycol or direct esterification of terephthalic acid and ethylene glycol followed by antimony trioxide catalysed polymerization under nitrogen gas, the improvement which comprises conducting said antimony-catalysed polymerization in admixture with an oxygen-containing oxidizing agent capable of oxidizing metallic antimony to trivalent antimony, selected from the group consisting of molecular oxygen, peroxides, alkali metal chlorates, alkali metal perchlorates, alkali metal perborates and alkali metal permanganates, said oxidizing gent being present in mount corresponding to between about 0.5 equivalent and about 6 equivalents of oxygen per mole of antimony trioxide employed, having a positive standard oxidation potential of at least about 0.2 volt and being added to the polymerization mixture after the polymerization process has proceeded to at least about 50 percent completion, wherein the polyester has an intrinsic viscosity of between about 0.4 and about 1.0.

2. The improvement according to claim 1 wherein the polyester is polyethylene terephthalate and the antimony trioxide catalyst is employed in an amount between about 0.01% and about 0.1%, based on the weight of said lower alkyl diester or terephthalic acid.

3. The improvement according to claim 1 wherein the antimony trioxide catalyst is employed in an amount between about 0.03% and about 0.6%, based on the weight of said lower alkyl diester or terephthalic acid, and the oxygen-containing oxidizing agent is present in amount corresponding to between 0.6 equivalent and about 4.0 equivalents of oxygen per mole of antimony trioxide employed.

4. The improvement according to claim 3 wherein the oxygen-containing oxidizing agent is molecular oxygen in a form selected from the group consisting of oxygen, air, and mixtures of oxygen and nitrogen.

5. The improvement according to claim 3 wherein the oxygen-containing oxidizing agent is a peroxide selected from the group consisting of performic acid, peracetic acid, and benzoyl peroxide.

6. The improvement according to claim 3 wherein the oxygen-containing oxidizing agent is an alkali metal chlorate selected from the group consisting of sodium chlorate and potassium chlorate.

7. The improvement according to claim 3 wherein the oxygen-containing oxidizing agent is an alkali metal perchlorate selected from the group consisting of sodium perchlorate and potassium perchlorate.

8. The improvement according to claim 3 wherein the oxygen-containing oxidizing agent is an alkali metal perborate selected from the group consisting of sodium perborate and potassium perborate.

9. The improvement according to claim 3 wherein the oxygen-containing oxidizing agent is an alkali metal permanganate selected from the group consisting of sodium permanganate and potassium permanganate.

References Cited

UNITED STATES PATENTS

| 2,647,885 | 8/1953 | Billica | 260—75 |
| 3,126,360 | 3/1964 | Riehl | 260—75 |
| 3,342,782 | 9/1967 | Barkey | 260—75 |

FOREIGN PATENTS

| 922,936 | 4/1963 | Great Britain. |

HAROLD D. ANDERSON, *Primary Examiner.*

LOUISE P. QUAST, *Assistant Examiner.*